United States Patent
Schlumpf et al.

(10) Patent No.: US 12,319,776 B2
(45) Date of Patent: Jun. 3, 2025

(54) SOLVENT FOR AROMATIC CARBOXYLIC OR SULFONIC ACIDS

(71) Applicant: SIKA TECHNOLOGY AG, Baar (CH)

(72) Inventors: Michael Schlumpf, Stallikon (CH); Andreas Kramer, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 1079 days.

(21) Appl. No.: 17/287,340

(22) PCT Filed: Nov. 11, 2019

(86) PCT No.: PCT/EP2019/080859
§ 371 (c)(1),
(2) Date: Apr. 21, 2021

(87) PCT Pub. No.: WO2020/099316
PCT Pub. Date: May 22, 2020

(65) Prior Publication Data
US 2021/0371571 A1   Dec. 2, 2021

(30) Foreign Application Priority Data

Nov. 14, 2018 (EP) ..................... 18206317

(51) Int. Cl.

| | | |
|---|---|---|
| *C08G 18/08* | (2006.01) | |
| *C08G 18/10* | (2006.01) | |
| *C08G 18/16* | (2006.01) | |
| *C08G 18/28* | (2006.01) | |
| *C08G 18/48* | (2006.01) | |
| *C08K 5/03* | (2006.01) | |
| *C08K 5/29* | (2006.01) | |

(52) U.S. Cl.
CPC ......... *C08G 18/0857* (2013.01); *C08G 18/10* (2013.01); *C08G 18/281* (2013.01); *C08G 18/4825* (2013.01); *C08G 18/4829* (2013.01); *C08K 5/29* (2013.01); *C08G 2150/00* (2013.01); *C08G 2170/00* (2013.01)

(58) Field of Classification Search
CPC ............ C08G 18/0857; C08G 18/4825; C08G 18/4829
See application file for complete search history.

(56) References Cited

U.S. PATENT DOCUMENTS

2013/0274368 A1* 10/2013 Krull ..................... B01J 19/126
                                                                 522/129
2017/0198081 A1*  7/2017 Burckhardt ............ C08G 18/10

FOREIGN PATENT DOCUMENTS

| CN | 101616891 A | 12/2009 |
|---|---|---|
| EP | 3 336 114 A1 | 6/2018 |
| JP | 2001-026734 A | 1/2001 |
| JP | 2003119280 A * | 4/2003 |
| JP | 2005-234162 A | 9/2005 |
| JP | 2011-508801 A | 3/2011 |
| JP | 2013-537220 A | 9/2013 |
| WO | 2017/108834 A1 | 6/2017 |
| WO | 2017/147030 A1 | 8/2017 |

OTHER PUBLICATIONS

Machine translation into English of JP-2003119280-A; Naruse (Year: 2003).*
May 27, 2021 International Preliminary Report on Patentability issued in International Patent Application No. PCT/EP2019/080859.

* cited by examiner

*Primary Examiner* — Karuna P Reddy
(74) *Attorney, Agent, or Firm* — Oliff PLC

(57) ABSTRACT

A method for preparing an acid solution by contacting at least one aromatic carboxylic or sulfonic acid with at least one polyether having blocked hydroxyl groups as a solvent. The polyether having blocked hydroxyl groups is not volatile and exhibits a surprisingly high dissolving capacity for the aromatic carboxylic or sulfonic acid. The acid solution is very compatible in curable compositions and does not cause any emission or odor or migration effects. The acid solution is particularly suitable as a constituent of polyurethane compositions having latent curing agents for accelerating the hydrolysis of the latent reactive groups.

8 Claims, No Drawings

SOLVENT FOR AROMATIC CARBOXYLIC OR SULFONIC ACIDS

TECHNICAL FIELD

The invention relates to a solvent for aromatic carboxylic or sulfonic acids, to the acid solutions obtained therefrom and to curable compositions comprising them, especially polyurethane compositions.

STATE OF THE ART

Aromatic carboxylic or sulfonic acids are often used as catalysts for polymer compositions, for example based on polyurethanes or epoxy resins. These acids are often high-melting solids that have to be dissolved for use in polymer compositions. But the use of conventional solvents is increasingly being avoided because they are volatile, flammable and in many cases toxic, lead to VOC emissions, shrinkage and odors on use, and often require occupational safety measures. Alternatively, it is possible to use glycols or polyols as nonvolatile solvents. But these are very hydrophilic by virtue of their content of hydroxyl groups and incompatible with many polymer compositions. Nonvolatile solvents used may also be plasticizers, for example phthalates or adipates, such as diisodecyl phthalate (DIDP) or di(2-ethylhexyl) adipate (DOA). But most plasticizers have unsatisfactory dissolution capacity for the acids, which means that only very dilute solutions are possible or constant heating of the solution is required in order to prevent the crystallization of the acid. Moreover, plasticizers can entail further disadvantages for the polymer composition, for example fogging or migration effects, such as exudation or staining.

There is therefore a need for a solvent which has high dissolution capacity for aromatic carboxylic or sulfonic acids, is nonvolatile and nontoxic, and is especially suitable for use in polymer compositions.

SUMMARY OF THE INVENTION

It is therefore an object of the present invention to provide a solvent for aromatic carboxylic or sulfonic acids that overcomes the disadvantages of the prior art in relation to dissolution capacity, volatility and compatibility with polymer compositions.

This object is achieved by the use of at least one polyether having blocked hydroxyl groups as described in claim 1. In spite of its polymeric structure, the polyether having blocked hydroxyl groups shows surprisingly high dissolution capacity for aromatic carboxylic or sulfonic acids and is extremely nonvolatile and nontoxic. It enables highly concentrated acid solutions that are surprisingly mobile and are usable over a prolonged period without heating without crystallization or precipitation of the acid. Such acid solutions can thus easily be produced, conveyed, transported and stored. They have excellent incorporability into a polymer composition, especially a polyurethane composition, have very good compatibility therein, even together with isocyanate groups, and do not cause any migration effects or fogging. They are very particularly advantageous in cases where the acid solution is metered in only in the course of dispensing of the composition, for example in the filling of a cartridge or a tubular bag, which, in the case of normal dispensing systems, is possible only with a small absolute amount of solution and accordingly requires a high acid concentration in order to assure the addition of a sufficient amount of acid.

Particularly advantageously, the acid solution of the invention is used in one-component moisture-curing polyurethane compositions containing isocyanate groups and latent curing agents such as, in particular, aldimines or oxazolidines.

The aromatic carboxylic or sulfonic acid acts here as catalyst for the hydrolysis of the latent curing agents. Such compositions cure without blisters and without development of odor under the influence of moisture, show barely any migration-related defects after curing, such as exudation or staining, and are especially suitable as adhesive, sealant or coating. In the prior art, di(2-ethylhexyl) adipate (DOA) is typically used as solvent for the aromatic carboxylic or sulfonic acid in such compositions. But this enables only very dilute solutions, and DOA tends to have migration effects.

Further aspects of the invention are the subject of further independent claims.

Particularly preferred embodiments of the invention are the subject of the dependent claims.

WAYS OF EXECUTING THE INVENTION

The invention provides for the use of at least one polyether having blocked hydroxyl groups as solvent for at least one aromatic carboxylic or sulfonic acid.

"Polyether" refers to a molecule or a group of oligomeric and/or polymeric molecules that consist mainly of repeat alkyleneoxy units.

A "blocked hydroxyl group" refers to a hydroxyl group converted by chemical reaction to a group unreactive toward isocyanate groups.

"Molecular weight" refers to the molar mass (in g/mol) of a molecule or a molecule residue. "Average molecular weight" refers to the number-average molecular weight $M_n$ of a polydisperse mixture of oligomeric or polymeric molecules or molecule residues. It is typically determined by means of gel permeation chromatography (GPC) against polystyrene as standard.

"Aromatic" refers to an acid or an isocyanate, the acid or isocyanate group of which is bonded directly to an aromatic carbon atom.

A "curable composition" refers to a composition containing polymerizable macromolecules, which, through cross-linking reactions of its reactive groups, can cure or attain a state of elevated mechanical strength.

"Plasticizer" refers to nonvolatile substances that lower the viscosity of a polymer, are not chemically incorporated within the polymer, and exert a plasticizing effect thereon.

Substance names beginning with "poly", such as polyamine, polyol or polyisocyanate, refer to substances containing, in a formal sense, two or more of the functional groups that occur in their name per molecule.

A curable composition referred to as "storage-stable" or "storable" is one that can be stored at room temperature in a suitable container over a prolonged period, typically over at least 3 months up to 6 months or more, without this storage resulting in any change in its application or use properties to an extent relevant to its use.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

A "one-component" composition refers to a curable composition in which all constituents of the composition are stored mixed together in the same container and which cures with moisture.

A "two-component" composition refers to a curable composition in which the constituents of the composition are in two different components which are stored in separate containers and are not mixed with one another until shortly before or during the application of the composition.

"Room temperature" refers to a temperature of 23éC.

The polyether having blocked hydroxyl groups is essentially free of unblocked hydroxyl groups. What is meant here by "essentially free" is that 95%, preferably 99%, especially 99.9%, most preferably 100%, of the hydroxyl groups present are blocked.

The polyether having blocked hydroxyl groups is preferably free of reactive groups that enter into crosslinking reactions with moisture or customary ingredients of curable compositions. It is thus especially free of isocyanate groups and silane groups.

The polyether having blocked hydroxyl groups is especially liquid at room temperature.

The polyether having blocked hydroxyl groups preferably has a viscosity at 20éC in the range from 30 to 5'000 mPa×s, more preferably 40 to 2'000 mPa×s, especially preferably 50 to 1'000 mPas, in particular 50 to 500 mPas. The viscosity is determined here with a cone-plate viscometer having cone diameter 25 mm, cone angle 1é, cone tip-plate distance 0.05 mm, at a shear rate of $10\ s^{-1}$.

This affords solutions having high acid concentration that are easy to handle.

The blocked hydroxyl groups are preferably selected from the group consisting of ester, aceto ester, carbonate and urethane groups.

These ester, aceto ester, carbonate or urethane groups preferably have 1 to 15 carbon atoms.

Particular preference is given to ester or urethane groups. Hydroxyl groups are particularly easily convertible to these groups, and they are particularly stable and compatible with aromatic carboxylic or sulfonic acids.

Very particular preference is given to an ester group, especially an ester group having 1 to 8 carbon atoms.

Most preferred is an acetate group. A polyether having blocked hydroxyl groups in the form of acetate groups is of particularly low viscosity, is obtainable in a very particularly simple manner and is particularly inexpensive.

Also preferred is a urethane group, especially a phenylurethane group or a p-toluenesulfonylurethane group. A polyether having such blocked hydroxyl groups has a manageable viscosity and is preparable in a particularly simple manner.

A preferred aceto ester group is an acetoacetate group.

A preferred carbonate group is a methyl carbonate group.

These are of low viscosity and are obtainable from inexpensive raw materials.

Repeat units present in the polyether having blocked hydroxyl groups are preferably 1,2-ethyleneoxy, 1,2-propyleneoxy, 1,3-propyleneoxy, 1,2-butyleneoxy or 1,4-butyleneoxy groups, especially 1,2-propyleneoxy groups.

Preferably, 70% to 100% by weight, especially 80% to 100% by weight, of the repeat units consist of 1,2-propyleneoxy groups, and 0% to 30% by weight, especially 0% to 20% by weight, of the repeat units consist of 1,2-ethyleneoxy groups.

More preferably, the repeat units consist entirely of 1,2-propyleneoxy groups.

Such polyethers are readily available, hydrophobic and hence particularly suitable as a constituent of curable compositions having low water absorption and good stability.

The polyether having blocked hydroxyl groups preferably has an average molecular weight $M_n$ in the range from 600 to 10'000 g/mol, more preferably 700 to 5'000 g/mol, especially 800 to 2'500 g/mol, determined by means of gel permeation chromatography (GPC) against polystyrene as standard with tetrahydrofuran as mobile phase, refractive index detector and evaluation from 200 g/mol.

Such polyethers having blocked hydroxyl groups enable solutions that are of low viscosity and hence easy to handle, and cause neither emission nor odor in curable compositions.

The polyether having blocked hydroxyl groups is preferably derived from at least one hydroxy-functional polyether selected from the group consisting of alcohol-started, especially n-butanol-started, polyoxypropylene monools having an OH number in the range from 25 to 90 mg KOH/g, preferably 50 to 80 mg KOH/g, polyoxypropylene diols having an OH number in the range from 12 to 155 mg KOH/g, preferably 22 to 125 mg KOH/g, especially 45 to 125 mg KOH/g, trimethylolpropane- or especially glycerol-started, optionally ethylene oxide-terminated polyoxypropylene triols having an average OH functionality in the range from 2.2 to 3 and an OH number in the range from 22 to 230 mg KOH/g, preferably 56 to 165 mg KOH/g, and sugar alcohol-started polyoxypropylene polyols having an average OH functionality in the range from 3 to 6, especially with threitol, erythritol, xylitol, mannitol or sorbitol as starter molecule. Such a polyether having blocked hydroxyl groups is commercially available as Sanflex⁺ S PX-80 (from Sanyo C hem. Ind.).

Among these, preference is given to alcohol-started, especially n-butanol-started, polyoxypropylene monools or polyoxypropylene diols.

Particular preference is given to polyoxypropylene diols. These are particularly inexpensive.

The preferred polyethers having blocked hydroxyl groups are preparable from readily available commodities in a simple process, are of low viscosity and enable acid solutions having a high concentration coupled with ease of handling.

The polyether having blocked hydroxyl groups is especially obtained by reacting at least one hydroxy-functional polyether with at least one suitable blocking agent for hydroxyl groups.

For the reaction, the blocking agent is used at least stoichiometrically in relation to the hydroxyl groups, such that the hydroxyl groups are essentially completely blocked and the polyether obtained is thus essentially free of hydroxyl groups. For the blocking, methods customary for the respective reactive groups are used, optionally with additional use of catalysts or solvents. If the blocking reaction forms elimination products, these are removed from the reaction mixture by a suitable method, especially by means of distillation.

Suitable blocking agents are nucleophilic compounds that enter into an addition or substitution reaction with hydroxyl groups.

Especially suitable are carboxylic acids, carbonyl chlorides, carboxylic esters or carboxylic anhydrides, diketene, 2,2,5-trimethyl-4H-1,3-dioxin-4-one, alkyl acetoacetates, dialkyl carbonates, monoisocyanates, (meth)acrylamides, methylenemalonates or cyanoacrylates.

Preference is given to carboxylic acids, carbonyl chlorides, carboxylic esters or carboxylic anhydrides, with formation of blocked hydroxyl groups in the form of ester groups. Among these, preference is given to carboxylic anhydrides or carboxylic esters, especially acetic anhydride.

In the case of acetic anhydride as blocking agent, the reaction releases acetic acid, with formation of blocked hydroxyl groups in the form of acetate groups.

In the case of isopropenyl acetate as blocking agent, the reaction releases acetone, likewise with formation of blocked hydroxyl groups in the form of acetate groups.

Preference is further given to diketene, 2,2,5-trimethyl-4H-1,3-dioxin-4-one or sterically hindered alkyl acetoacetates such as, in particular, tert-butyl acetoacetate, with formation of blocked hydroxyl groups in the form of aceto ester groups.

Preference is further given to dialkyl carbonates, especially dimethyl carbonate, with formation of blocked hydroxyl groups in the form of carbonate groups, especially methyl carbonate groups.

Preference is further given to monoisocyanates, with formation of blocked hydroxyl groups in the form of urethane groups. Preference is given to phenyl isocyanate or p-toluenesulfonyl isocyanate.

Suitable hydroxy-functional polyethers are especially those having an average OH functionality in the range from 1 to 6 and an average molecular weight in the range from 500 to 10'000 g/mol, more preferably 600 to 5'000 g/mol, especially 700 to 2'500 g/mol.

Preference is given to polyoxypropylene monools having an OH number in the range from 25 to 90 mg KOH/g, preferably 50 to 80 mg KOH/g, especially alcohol-started polyoxypropylene monools, especially started from methanol, ethanol, propanol, isopropanol, n-butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol. Among these, preference is given to alkyl alcohol-started polyoxypropylene monools, especially started from methanol, ethanol or n-butanol. Particular preference is given to n-butanol-started polyoxypropylene monools having an average molecular weight $M_n$ in the range from 650 to 2'000 g/mol, especially 700 to 1'500 g/mol. n-Butanol-started polyoxypropylene monools are commercially available, for example as Synalox⁺ 100-20B, Synalox⁺ 100-40B or Synalox⁺ 100-85B (all from DowDuPont Inc.). Also preferred are polyoxypropylene diols having an OH number in the range from 12 to 155 mg KOH/g, preferably 22 to 125 mg KOH/g, especially 45 to 125 mg KOH/g.

Also preferred are trimethylolpropane- or especially glycerol-started, optionally ethylene oxide-terminated polyoxypropylene triols having an average OH functionality in the range from 2.2 to 3 and an OH number in the range from 22 to 230 mg KOH/g, preferably 56 to 165 mg KOH/g.

Also preferred are sugar alcohol-started polyoxypropylene polyols having an average OH functionality of at least 3, especially in the range from 3 to 6, especially with threitol, erythritol, xylitol, mannitol or sorbitol as starter molecule.

A suitable aromatic carboxylic or sulfonic acid is especially benzoic acid, salicylic acid, 2-nitrobenzoic acid, 2-chlorobenzoic acid, p-toluenesulfonic acid or mixtures of two or more of the aforementioned acids.

The aromatic carboxylic or sulfonic acid is preferably selected from the group consisting of benzoic acid, 2-nitrobenzoic acid, salicylic acid and p-toluenesulfonic acid.

Particular preference is given to salicylic acid.

The preferred aromatic carboxylic or sulfonic acids are readily available and enable particularly rapid hydrolysis of latent curing agents having aldimino, ketimino, enamino or oxazolidino groups. They are solid and high-melting at room temperature, and therefore require a solvent to be easily usable in curable compositions.

The use described results in an acid solution.

The invention thus further provides the acid solution from the use described.

Such an acid solution is especially suitable as catalyst for the hydrolysis of latent curing agents having aldimino, ketimino, enamino or oxazolidino groups, especially in a curable composition comprising isocyanate groups.

More particularly, the acid solution is liquid at room temperature and contains essentially no fractions of undissolved aromatic carboxylic or sulfonic acid.

The solution is preferably liquid at 4éC and can be stored at 4éC in a closed container for 7 days without crystallization of fractions of the aromatic carboxylic or sulfonic acid.

The acid solution preferably contains 2.5% to 25% by weight of the aromatic carboxylic or sulfonic acid and 50% to 97.5% by weight, especially 75% to 97.5% by weight, of polyether having blocked hydroxyl groups.

The acid solution more preferably contains 5% to 20%, especially 7.5% to 15%, by weight of the aromatic carboxylic or sulfonic acid and 80% to 95%, especially 85% to 92.5%, by weight of polyether having blocked hydroxyl groups.

The acid solution preferably has a viscosity at 20éC in the range from 40 to 8'000 mPa×s, more preferably 50 to 4'000 mPa×s, especially preferably 60 to 2'000 mPas, in particular 70 to 1'000 mPas. The viscosity is determined here with a cone-plate viscometer having cone diameter 25 mm, cone angle 1é, cone tip-plate distance 0.05 mm, at a shear rate of $10 \text{ s}^{-1}$.

The acid solution is preferably prepared either by metering the aromatic carboxylic or sulfonic acid into an initial charge of the polyether having blocked hydroxyl groups at a temperature in the range from 15 to 100éC, especially 20 to 90éC, while stirring or by dissolving a mixture comprising the polyether having blocked hydroxyl groups and the aromatic carboxylic or sulfonic acid at a temperature in the range from 15 to 100éC, especially 20 to 90éC. In both cases, stirring is continued until the aromatic carboxylic or sulfonic acid has dissolved completely. The acid solution is preferably stored in a closed container until further use.

If desired, the acid solution, in addition to the polyether having blocked hydroxyl groups and to the aromatic carboxylic or sulfonic acid, may comprise further substances, especially plasticizers, further acids, acid esters, acid anhydrides or silyl esters of acids, or catalysts, especially at least one catalyst for the acceleration of the reaction of isocyanate groups, especially organotin(IV) compounds, complexes of bismuth(III) or zirconium(IV), or compounds containing tertiary amino groups, such as, in particular, 2,2'-dimorpholinodiethyl ether (DMDEE).

The solution is preferably free of further substances.

Preference is given to using the acid solution as catalyst for the crosslinking of a curable composition.

The curable composition preferably has isocyanate groups and/or silane groups, especially isocyanate groups.

The acid solution is preferably used in a composition containing isocyanate groups for acceleration of the hydrolysis of at least one latent curing agent. The polyether having blocked hydroxyl groups has particularly good compatibility in such a composition and is especially very storage-stable even together with isocyanate groups.

The invention thus further provides a curable composition comprising the acid solution described.

The acid solution present in the composition may be prepared separately and mixed into the composition, or it may be prepared directly in the composition at any time.

The acid solution present in the composition is preferably prepared separately.

The curable composition preferably contains 0.01% to 0.5% by weight, especially 0.02% to 0.25% by weight, of the dissolved aromatic carboxylic or sulfonic acid.

The curable composition preferably comprises
at least one polyisocyanate or polymer containing isocyanate groups,
at least one latent curing agent having at least one aldimino, ketimino, enamino or oxazolidino group,
at least one polyether having blocked hydroxyl groups, as described above, and
at least one aromatic carboxylic or sulfonic acid.

Preference is given to aliphatic, cycloaliphatic or aromatic diisocyanates, especially hexamethylene 1,6-diisocyanate (HDI), 1-isocyanato-3,3,5-trimethyl-5-isocyanatomethylcyclohexane (isophorone diisocyanate or IP DI), perhydro(diphenylmethane 2,4'- and/or 4,4'-diisocyanate) ($H_{12}MDI$), diphenylmethane 4,4'-diisocyanate, with or without fractions of diphenylmethane 2,4'- and/or 2,2'-diisocyanate (MDI), or tolylene 2,4-diisocyanate or mixtures thereof with tolylene 2,6-diisocyanate (TDI), mixtures of MDI and MDI homologs (polymeric MDI or P MDI) or oligomeric isocyanates.

Suitable oligomeric isocyanates are especially HDI biurets such as Desmodur⁺ N 100 or N 3200 (from Covestro AG), Tolonate⁺ HDB or HDB-LV (from Vencorex Holding SAS) or Duranate⁺ 24A-100 (from Asahi Kasei Corp.); HDI isocyanurates such as Desmodur⁺ N 3300, N 3600 or N 3790 BA (all from Covestro AG), Tolonate⁺ HDT, HDT-LV or HDT-LV2 (from Vencorex Holding SAS), Duranate⁺ TPA-100 or THA-100 (from Asahi Kasei Corp.) or Coronate⁺ HX (from Tosoh Corp.); HDI uretdiones such as Desmodur⁺ N 3400 (from Covestro AG); HDI iminooxadiazinediones such as Desmodur⁺ XP 2410 (from Covestro AG); HDI allophanates such as Desmodur⁺ VP LS 2102 (from Covestro AG); IP DI isocyanurates, for example in solution as Desmodur⁺ Z 4470 (from Covestro AG) or in solid form as Vestanat⁺ T1890/100 (from Evonik Industries AG); TDI oligomers such as Desmodur⁺ IL (from Covestro AG); or mixed isocyanurates based on TDI/HDI, such as Desmodur⁺ HL (from Covestro AG).

A particularly preferred polyisocyanate is HDI, IP DI, TDI, MDI or a form of MDI which is liquid at room temperature.

A form of MDI which is liquid at room temperature is either 4,4=MDI liquefied by partial chemical modification—especially carbodiimidization or uretonimine formation or adduct formation with polyols—or it is a mixture of 4,4=MDI with other MDI isomers (2,4=MDI and/or 2,2=MDI), and/or with MDI oligomers and/or MDI homologs (polymeric MDI or P MDI), that has been brought about selectively by blending or results from the production process.

A further particularly preferred polyisocyanate is an IPDI isocyanurate or a TDI oligomer or a mixed isocyanurate based on TDI/HDI or an HDI oligomer.

A suitable polymer containing isocyanate groups is especially obtained from the reaction of at least one polyol with a superstoichiometric amount of at least one diisocyanate, preferably MDL TDI, IP DI or HDI. The reaction is preferably conducted with exclusion of moisture at a temperature in the range from 20 to 160éC, especially 40 to 140éC, optionally in the presence of suitable catalysts.

The polymer is optionally prepared with additional use of plasticizers or solvents, in which case the plasticizers or solvents used do not contain any groups reactive toward isocyanates.

For use in a two-component composition, the excess of diisocyanate is preferably chosen so as to leave, in the polymer containing isocyanate groups, after the reaction of all hydroxyl groups, a content of isocyanate groups in the range from 1% to 30% by weight, preferably 1.5% to 25% by weight, more preferably 2% to 20% by weight, based on the overall polymer.

Such a polymer containing isocyanate groups preferably has an average molecular weight $M_n$ in the range from 350 to 6'000 g/mol.

For use in a one-component composition, the NCO/OH ratio is preferably in the range from 1.3/1 to 10/1. The monomeric diisocyanate remaining in the reaction mixture after the reaction of the OH groups can be removed, especially by means of distillation. The resultant polymer preferably has a content of isocyanate groups in the range from 0.5% to 10% by weight, especially 1% to 5% by weight, more preferably 1% to 3% by weight, and preferably has an average molecular weight $M_n$ in the range from 1'500 to 20'000 g/mol, especially 2'000 to 15'000 g/mol. If excess monomeric diisocyanate is removed by means of distillation, the NCO/OH ratio in the reaction is preferably in the range from 4/1 to 7/1, and the resultant polymer containing isocyanate groups, after the distillation, preferably contains not more than 0.5% by weight, more preferably not more than 0.3% by weight, of monomeric diisocyanate. The monomeric diisocyanate is especially removed by means of short-path distillation under reduced pressure.

If no excess monomeric diisocyanate is removed from the polymer, the NCO/OH ratio in the reaction is preferably in the range from 1.3/1 to 2.5/1.

Suitable polyols are commercial polyols or mixtures thereof, especially
polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene/acrylonitrile (SAN) particles or polyurea or polyhydrazodicarbonamide (PHD) particles.

Preferred polyether polyols are polyoxypropylene diols or polyoxypropylene triols, or what are called ethylene oxide-terminated (EO-capped or EO-tipped) polyoxypropylene diols or triols. The latter are mixed polyoxyethylene/polyoxypropylene polyols which are especially obtained in that polyoxypropylene diols or triols, on conclusion of the polypropoxylation reaction, are further alkoxylated with ethylene oxide and hence have primary hydroxyl groups.

Preferred polyether polyols have a level of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols, such as, in particular, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid, cyclohexane-1,2-dicarboxylic acid, cyclohexane-1,3-dicarboxylic acid or cyclohexane-1,4-dicarboxylic acid or mixtures of the aforementioned acids, or polyester polyols formed from lactones such as, in particular, -caprolactone. Particular preference is given to polyester polyols formed from adipic acid or sebacic acid or dodecanedicarboxylic acid and hexanediol or neopentyl glycol.

Polycarbonate polyols as obtainable by reaction, for example, of the abovementioned alcohols—used to form the polyester polyols—with dialkyl carbonates, diaryl carbonates or phosgene.

Block copolymers bearing at least two OH groups and having at least two different blocks having polyether, polyester and/or polycarbonate structure of the type described above, especially polyether polyester polyols.

Polyacrylate or polymethacrylate polyols.

Polyhydroxy-functional fats or oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes, such as alcoholysis or ozonolysis, and subsequent chemical linkage, for example by transesterification or dimerization, of the degradation products or derivatives thereof thus obtained. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Polyhydrocarbon polyols, also called oligohydrocarbonols, such as, in particular, polyhydroxy-functional polyolefins, polyisobutylenes, polyisoprenes; polyhydroxy-functional ethylene/propylene, ethylene/butylene or ethylene/propylene/diene copolymers, as produced, for example, by Kraton Polymers; polyhydroxy-functional polymers of dienes, especially of 1,3-butadiene, which can especially also be prepared from anionic polymerization; polyhydroxy-functional copolymers of dienes, such as 1,3-butadiene, or diene mixtures and vinyl monomers, such as styrene, acrylonitrile, vinyl chloride, vinyl acetate, vinyl alcohol, isobutylene or isoprene, especially polyhydroxy-functional acrylonitrile/butadiene copolymers, as can be prepared, in particular, from epoxides or amino alcohols and carboxyl-terminated acrylonitrile/butadiene copolymers (commercially available, for example, under the Hypro+ CTBN or CTBNX or ETBN name from Emerald Performance Materials); or hydrogenated polyhydroxy-functional polymers or copolymers of dienes.

Also especially suitable are mixtures of polyols.

Preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, or polycarbonate polyols, especially aliphatic polycarbonate polyols.

Especially preferred are polyether polyols, especially polyoxyalkylene polyols.

Most preferred are polyoxypropylene di- or triols or ethylene oxide-terminated polyoxypropylene di- or triols.

Preference is given to polyols having an average molecular weight $M_n$ in the range from 400 to 20'000 g/mol, preferably from 1'000 to 15'000 g/mol. Preference is given to polyols having an average OH functionality in the range from 1.6 to 3.

Preference is given to polyols that are liquid at room temperature.

In the preparation of a polymer containing isocyanate groups, it is also possible to use fractions of di- or polyfunctional alcohols, especially ethane-1,2-diol, propane-1,2-diol, propane-1,3-diol, 2-methylpropane-1,3-diol, butane-1,2-diol, butane-1,3-diol, butane-1,4-diol, pentane-1,3-diol, pentane-1,5-diol, 3-methylpentane-1,5-diol, neopentyl glycol, dibromoneopentyl glycol, hexane-1,2-diol, hexane-1,6-diol, heptane-1,7-diol, octane-1,2-diol, octane-1,8-diol, 2-ethylhexane-1,3-diol, diethylene glycol, triethylene glycol, dipropylene glycol, tripropylene glycol, cyclohexane-1,3- or -1,4-dimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols, such as especially xylitol, sorbitol or mannitol, or sugars such as, in particular, sucrose, or alkoxylated derivatives of the alcohols mentioned or mixtures of the alcohols mentioned.

Preference is especially also given to combinations of one or more polyisocyanates and one or more polymers containing isocyanate groups.

For the use in a hot-melt adhesive, a polymer containing isocyanate groups which is solid at room temperature is preferred, which is prepared starting from at least one polyol which is solid at room temperature and a diisocyanate, especially MDI. A suitable polyol which is solid at room temperature is crystalline, partially crystalline or amorphous at room temperature. Its melting point is preferably in the range from 50 to 180éC, especially 70 to 150éC. Preference is given to polyester polyols, especially those derived from hexanediol and adipic acid or dodecanedicarboxylic acid, or acrylate polyols.

The latent curing agent preferably contains at least one group selected from aldimino groups, ketimino groups, enamino groups and oxazolidino groups, and at least one further group selected from hydroxyl groups, primary and secondary amino groups, aldimino groups, ketimino groups, enamino groups and oxazolidino groups.

Latent curing agents containing hydroxyl groups or primary or secondary amino groups are particularly suitable for two- or multicomponent compositions. If they are used in one-component compositions, they react when mixed with isocyanates and form reaction products having aldimino groups, ketimino groups, enamino groups or oxazolidino groups. It is possible here to lower the content of monomeric diisocyanates in polymers containing isocyanate groups, which is advantageous for toxicological reasons.

The latent curing agent more preferably contains two or three reactive groups selected from aldimino groups and oxazolidino groups. Such a latent curing agent is particularly suitable for one-component compositions.

Preference is given to di- or trialdimines or bisoxazolidines.

Suitable bisoxazolidines are especially compounds of the formulae

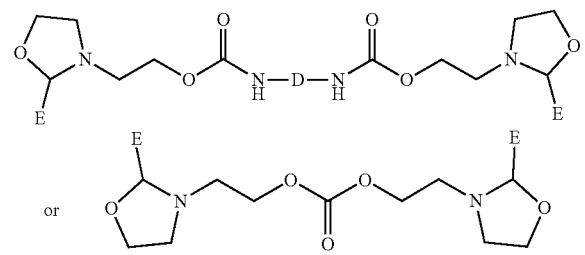

where

D is a divalent hydrocarbyl radical having 6 to 15 carbon atoms, especially 1,6-hexamethylene or (1,5,5-trimethylcyclohexan-1-yl)methane-1,3 or 4(2)-methyl-1,3-phenylene, and E is an organic radical having 3 to 30 carbon atoms, especially 2-propyl or 3-heptyl or phenyl or alkyl-substituted phenyl, especially 4-decylphenyl, 4-undecylphenyl, 4-dodecylphenyl, 4-tridecylphenyl or 4-tetradecylphenyl, in which the 4-alkyl radicals are mainly in branched form.

The latent curing agent is preferably an aldimine of the formula $A\text{-}[N{=}B]_y$, where y is 2 or 3, A is an organic radical having 2 to 23 carbon atoms, and B is an organic radical having 6 to 30 carbon atoms.

A is preferably an alkylene radical optionally having cyclic components or a di- or trivalent polyoxyalkylene radical having 5 to 15 carbon atoms, especially 1,6-hexylene, (1,5,5-trimethylcyclohexan-1-yl)methane-1,3 or, <<-polyoxypropylene having an average molecular weight $M_n$ in the range from 170 to 300 g/mol or trimethylolpropane-started tris(<<-polyoxypropylene) having an average molecular weight $M_n$ in the range from 330 to 500 g/mol.

B is preferably an organic radical having 7 to 22 carbon atoms, especially 2,2-dimethyl-3-acetoxypropylidene, 2,2-dimethyl-3-lauroyloxypropylidene, 2,2-dimethyl-3-(N-morpholino)propylidene, benzylidene or alkyl-substituted benzylidene, especially 4-decylbenzylidene, 4-undecylbenzylidene, 4-dodecylbenzylidene, 4-tridecylbenzylidene or 4-tetradecylbenzylidene, in which the 4-alkyl radicals are mainly branched.

More preferably, B is a radical having at least 15 carbon atoms, especially 2,2-dimethyl-3-lauroyloxypropylidene or alkyl-substituted benzylidene. Such an aldimine is odorless.

An aldimine of the formula $A\text{-}[N{=}B]_y$ is especially obtained by reaction of an amine of the formula $A\text{-}(NH_2)_y$ with an aldehyde of the formula $O{=}B$, with removal of water of condensation.

Preferred amines $A\text{-}(NH_2)_y$ are aliphatic or cycloaliphatic primary di- or triamines, especially hexamethylene-1,6-diamine, isophoronediamine, <<-polyoxypropylenediamines having an average molecular weight $M_n$ in the range from 200 to 350 g/mol, especially Jeffamine⁺ D-230 (from Huntsman Corp.), or trimethylolpropane-started tris(<<-polyoxypropyleneamine), especially Jeffamine⁺ T-403 (from Huntsman Corp.).

Preferred aldehydes $O{=}B$ are aldol esters of carboxylic acids, especially 2,2-dimethyl-3-acetoxypropanal, 2,2-dimethyl-3-lauroxyloxypropanal, 2,2-dimethyl-3-(N-morpholino)propanal, benzaldehydes, or benzaldehydes substituted by alkyl radicals, especially 4-decylbenzaldehyde, 4-undecylbenzaldehyde, 4-dodecylbenzaldehyde, 4-tridecylbenzaldehyde or 4-tetradecylbenzaldehyde, in which the 4-alkyl radicals are mainly branched, and mixtures of these benzaldehydes substituted by alkyl radicals.

On contact with moisture, the latent curing agent releases amino groups and possibly hydroxyl groups, which react with isocyanates and act as crosslinkers.

This releases an aldehyde or ketone.

In the case of the preferred aldehydes of the formula $O{=}B$ in which B is a long-chain radical, especially a radical having 15 or more carbon atoms, this does not cause any odor problems and remains in the composition after curing, where it has good compatibility and acts as plasticizer.

Compared to the direct reaction of water with isocyanates, crosslinking via latent curing agents has the advantage that no $CO_2$ is released, which greatly reduces the tendency to formation of blisters in the course of curing.

The composition preferably contains such an amount of latent curing agents that the ratio between the number of reactive groups releasable therefrom and the number of isocyanate groups is in the range from 0.1 to 1.5, preferably 0.2 to 1.1, especially 0.3 to 1.0.

The curable composition preferably additionally contains one or more further constituents, especially selected from plasticizers, fillers and catalysts for the reaction of isocyanate groups.

Suitable plasticizers are especially carboxylic acid esters, such as phthalates, especially diisononyl phthalate (DINP), diisodecyl phthalate (DIDP) or di(2-propylheptyl)phthalate (DP HP), hydrogenated phthalates or cyclohexane-1,2-dicarboxylates, especially hydrogenated diisononyl phthalate or diisononyl cyclohexane-1,2-dicarboxylate (DINCH), terephthalates, especially bis(2-ethylhexyl) terephthalate (DOTP) or diisononyl terephthalate (DINT), hydrogenated terephthalates or cyclohexane-1,4-dicarboxylates, especially hydrogenated bis(2-ethylhexyl) terephthalate or bis(2-ethylhexyl) cyclohexane-1,4-dicarboxylate, or hydrogenated diisononyl terephthalate or diisononyl cyclohexane-1,4-dicarboxylate, isophthalates, trimellitates, adipates, especially dioctyl adipate, azelates, sebacates, benzoates, glycol ethers, glycol esters, plasticizers having polyether structure, such as, in particular, the described polyethers having blocked hydroxyl groups, organic phosphoric or sulfonic acid esters, polybutenes, polyisobutenes or plasticizers derived from natural fats or oils, especially epoxidized soybean or linseed oil.

Preferred plasticizers are diisononyl phthalate, diisodecyl phthalate or the described polyethers having blocked hydroxyl groups.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, calcined kaolins or industrially produced carbon blacks.

Suitable catalysts for the acceleration of the reaction of isocyanate groups are especially organotin(IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as especially 2,2'-dimorpholinodiethyl ether (DMDEE).

The curable composition may contain further additions, especially

- inorganic or organic pigments, especially titanium dioxide, chromium oxides or iron oxides;
- fibers, especially glass fibers, carbon fibers, metal fibers, ceramic fibers, polymer fibers, such as polyamide fibers or polyethylene fibers, or natural fibers, such as wool, cellulose, hemp or sisal;
- nanofillers such as graphene or carbon nanotubes;
- dyes;
- desiccants, especially molecular sieve powder, calcium oxide, highly reactive isocyanates such as p-tosyl isocyanate, monooxazolidines such as Incozor$^+$ 2 (from Incorez) or orthoformic esters;
- adhesion promoters, especially organoalkoxysilanes, especially epoxysilanes, such as especially 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;
- further catalysts which accelerate the reaction of the isocyanate groups, especially salts, soaps or complexes of tin(II), zinc, iron, aluminum, molybdenum, dioxomolybdenum, titanium or potassium, especially tin(II) 2-ethylhexanoate, tin(II) neodecanoate, zinc(II) acetate, zinc(II) 2-ethylhexanoate, zinc(II) laurate, zinc(II) acetylacetonate, aluminum lactate, aluminum oleate, diisopropoxytitanium bis(ethyl acetoacetate) or potassium acetate; compounds containing tertiary amino groups, especially N-ethyldiisopropylamine, N,N,N',N'-tetramethylalkylenediamines, pentamethylalkylenetriamines and higher homologs thereof, bis(N,N-diethylaminoethyl) adipate, tris(3-dimethylaminopropyl)amine, 1,4-diazabicyclo[2.2.2]octane (DABCO), 1,8-diazabicyclo[5.4.0]undec-7-ene (DBU), 1,5-diazabicyclo[4.3.0]non-5-ene (DBN), N-alkylmorpholines, N,N'-dimethylpiperazine; aromatic nitrogen compounds, such as 4-dimethylaminopyridine, N-methylimidazole, N-vinylimidazole or 1,2-dimethylimidazole; organic ammonium compounds, such as benzyltrimethylammonium hydroxide or alkoxylated tertiary amines; what are called "delayed action" catalysts, which are modifications of known metal or amine catalysts;
- rheology modifiers, especially thickeners, especially sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;
- solvents, especially acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, especially Solvessoù grades (from ExxonMobil Chemical Co.), and propylene carbonate, dimethyl carbonate, butyrolactone, N-methylpyrrolidone, N-ethylpyrrolidone, p-chlorobenzotrifluoride or benzotrifluoride;
- natural resins, fats or oils, such as rosin, shellac, linseed oil, castor oil or soybean oil;
- nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-olefins (APAO);
- flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates;
- additives, especially wetting agents, leveling agents, defoamers, deaerators, stabilizers against oxidation, heat, light or UV radiation, or biocides;
- or further substances customarily used in curable compositions.

It may be advisable to chemically or physically dry certain substances before mixing them into the composition.

The curable composition preferably comprises

- 10% to 70% by weight, especially 20% to 50% by weight, of polymers containing isocyanate groups,
- 0.1% to 20% by weight, especially 1% to 15% by weight, of latent curing agents,
- 20% to 60% by weight of fillers,
- 5% to 40% by weight of plasticizers, and
- 0.01% to 0.5% by weight, especially 0.02% to 0.25% by weight, of aromatic carboxylic or sulfonic acid dissolved in the polyether having blocked hydroxyl groups.

If desired, the polyether having blocked hydroxyl groups may also be present at least partly as plasticizer in the curable composition.

The curable composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The curable composition may be in the form of a one-component composition or in the form of a multi-component, especially two-component, composition.

The curable composition is preferably a one-component moisture-curing composition. Given suitable packaging and storage, it is storage-stable, typically over several months, up to one year or longer.

In one embodiment, the curable composition has two components and consists of a first component comprising at least one polyol, and a second component comprising at least one polyisocyanate and optionally at least one polymer containing isocyanate groups. The latent curing agent or the acid solution described may each be present in one of the two or both components. Suitable polyols are especially the polyols mentioned above for preparation of polymers containing isocyanate groups.

On application of the curable composition, the process of curing commences.

In the case of a one-component moisture-curing composition, it is applied as such and then begins to cure under the influence of moisture or water. For acceleration of the curing, an accelerator component which contains or releases water and/or a catalyst can be mixed into the composition on application, or the composition, after application thereof, can be contacted with such an accelerator component. In the case of a two-component composition, it is applied after the mixing of the two components and begins to cure by internal reaction, and the curing may be completed by the action of external moisture. The two components can be mixed continuously or batchwise with dynamic mixers or static mixers.

In the course of curing, isocyanate groups present react under the influence of moisture with one another and/or with any further reactive groups present in the composition, especially hydroxyl groups or amino groups. In addition, the isocyanate groups react with the reactive groups of the latent curing agents present as they are hydrolyzed.

The acid solution present in the composition especially accelerates the hydrolysis of the latent curing agents and promotes rapid, blister-free curing.

The moisture required for curing of a moisture-curing composition preferably gets into the composition through diffusion from the air (air humidity). In the process, a solid layer of cured composition (skin) is formed on the surfaces of the composition which come into contact with air. The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The curable composition is preferably applied at ambient temperature, especially in the range from about −10 to 50èC, preferably in the range from −5 to 45èC, especially 0 to 40èC.

The composition is preferably likewise cured at ambient temperature.

The composition is suitable fora multitude of uses.

The composition is preferably an adhesive or sealant or coating.

The adhesive or sealant or coating is preferably elastic.

The curable polyurethane composition as adhesive and/or sealant is especially suitable for bonding and sealing applications in the construction and manufacturing industry or in motor vehicle construction, especially for parquet bonding, assembly, bonding of installable components, module bonding, pane bonding, join sealing, bodywork sealing, seam sealing or cavity sealing.

Elastic bonds in motor vehicle construction are, for example, the bonded attachment of parts such as plastic covers, trim strips, flanges, fenders, driver's cabins or other installable components to the painted body of a motor vehicle, or the bonding of panes into the vehicle body, said motor vehicles especially being automobiles, trucks, buses, rail vehicles or ships.

The curable polyurethane composition as sealant is especially suitable for the elastic sealing of all kinds of joins, seams or cavities, especially of joins in construction, such as expansion joins or connection joins between structural components, or of floor joins in civil engineering.

The curable polyurethane composition as coating is especially suitable for protection and/or for sealing of built structures or parts thereof, especially for balconies, terraces, roofs, especially flat roofs or slightly inclined roof areas or roof gardens, or in building interiors beneath tiles or ceramic plates in wet rooms or kitchens, or in collection pans, conduits, shafts, silos, tanks or wastewater treatment systems.

It can also be used for repair purposes as seal or coating, for example of leaking roof membranes or floor coverings that are no longer fit for purpose, or as repair compound for highly reactive spray seals.

The curable composition may be formulated in such a way that it has a pasty consistency with a high yield point, especially for use as an adhesive or sealant. Such a composition can be applied by spatula or under pressure by means of a suitable device, for example by means of a cartridge gun or a drum pump or an application robot, wherein the composition is especially discharged in the form of a bead having an essentially round or triangular cross-sectional area.

The curable composition can also be formulated such that it is fluid and "self-leveling" or only slightly thixotropic, especially for use as sealing compound or coating. Such a composition can be applied by pouring it out or by spatula. In the form of a coating, it can then be distributed over an area to give the desired thickness, for example by means of a roll, doctor blade, notched trowel or rubber squeegee. In one operation, typically a layer thickness in the range from 0.5 to 5 mm, especially 1 to 3 mm, is applied.

Suitable substrates which can be bonded or sealed or coated with the curable composition are especially
  glass, glass ceramic, concrete, mortar, cement screed, fiber cement, especially fiber cement boards, brick, tile, gypsum, especially gypsum boards or anhydride screed, or natural stone, such as granite or marble;
  repair or leveling compounds based on PCC (polymer-modified cement mortar) or ECC (epoxy resin-modified cement mortar);
  metals or alloys, such as aluminum, copper, iron, steel, nonferrous metals, including surface-finished metals or alloys, such as zinc-plated or chromium-plated metals;
  asphalt or bitumen;

leather, textiles, paper, wood, wood materials bonded with resins, such as phenolic, melamine or epoxy resins, resin/textile composites or further materials called polymer composites;

plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rock wool, glass wool or foamed glass;

coated or painted substrates, especially painted tiles, coated concrete, powder-coated metals or alloys or painted metal sheets;

paints or varnishes, especially automotive topcoats.

If required, the substrates can be pretreated prior to application, especially by physical and/or chemical cleaning methods or the application of an activator or a primer.

It is possible to bond and/or seal identical or different substrates.

The application and curing of the curable composition afford an article.

The invention thus further provides an article bonded, sealed or coated with the composition described.

The article is especially a built structure above or below ground or part thereof, especially a bridge, a roof, a staircase or a fa'ade, or an industrial good or a consumer good, especially a window, a pipe, a rotor blade of a wind turbine, a domestic appliance or a mode of transport, especially an automobile, a bus, a truck, a rail vehicle, a ship, an aircraft or a helicopter, or an installable component thereof.

The curable composition has advantageous properties. It is very easy to produce, especially owing to the acid solution of the invention, which is of low viscosity and enables a high acid concentration. It cures rapidly and without blisters and without development of odor or emissions, and, after curing, on account of the good compatibility of the acid solution, shows barely any migration-related defects such as exudation or staining.

EXAMPLES

Working examples are adduced hereinafter, which are intended to elucidate the invention described. The invention is of course not limited to these described working examples.

"Standard climatic conditions" ("SCC") refer to a temperature of 23, 1éC and a relative air humidity of 50, 5%.

Unless otherwise stated, the chemicals used were from Sigma-Aldrich Chemie GmbH.

Commercial Plasticizers Used:

DIDP: diisodecyl phthalate (Palatine+ 10-P, from BASF S E)

DOA di(2-ethylhexyl) adipate (Plastomoll+ DOA, from BASF S E)

SPX-80 Branched polyether polyol having esterified hydroxyl groups, and average molecular weight about 5'000 g/mol (Sanflex+ SPX-80, from Sanyo Chem. Ind.)

Preparation of Polyethers Having Blocked Hydroxyl Groups:

Viscosity was measured with a thermostated Rheotec RC30 cone-plate viscometer (cone diameter 25 mm, cone angle 1é, cone tip-plate distance 0.05 mm, shear rate 10 s$^{-1}$).

Infrared spectra (FT-IR) were measured as undiluted films on a Nicolet i55 FT-IR instrument from Thermo Scientific equipped with a horizontal ATR measurement unit with a diamond crystal. The absorption bands are reported in wavenumbers (cm$^{-1}$).

$^1$H NMR spectra were measured on a spectrometer of the Bruker Ascend 400 type at 400.14 MHz; the chemical shifts are reported in ppm relative to tetramethylsilane (TMS). No distinction was made between true coupling and pseudo-coupling patterns.

Polyether-1: n-Butanol-Started Acetylated PPG Monool with Average Molecular Weight about 800 g/mol 120.00 g of n-butanol-started polyoxypropylene monool (Synalox+ 100-20B, average molecular weight about 750 g/mol; from DowDuPont Inc.) and 18.74 g of acetic anhydride were initially charged in a round-bottom flask with distillation attachment under a nitrogen atmosphere. Then the reaction mixture was stirred under a gentle nitrogen stream at 130éC, with collection of acetic acid as distillate. Subsequently, the volatile constituents were removed from the reaction mixture at 80éC and a reduced pressure of 10 mbar. A clear, colorless liquid having a viscosity of 75 mPa×s at 20éC was obtained.

FT-IR: 2970, 2931, 2867, 1738, 1454, 1372, 1345, 1296, 1241, 1098, 1014, 959, 925, 866, 827.

$^1$H NMR (CDCl$_3$): 5.02 (hept., 1H, CH$_2$(CH$_3$)CH—OAc), 3.75-3.34 (2×m, ca. 39H, OCH$_2$CH(CH$_3$)O), 3.33-3.28 (m, 2H, CH$_3$CH$_2$CH$_2$CH$_2$O), 2.04 (s, 3H, O(CO)CH$_3$), 1.55 (quint., 2H, CH$_3$CH$_2$CH$_2$CH$_2$O), 1.36 (sext., 2H, CH$_3$CH$_2$CH$_2$CH$_2$O), 1.22 (d, 3H, CH$_2$(CH$_3$)CH—OAc), 1.17-1.10 (m, about 36H, OCH$_2$CH(CH$_3$)O), 0.91 (t, 3H, CH$_3$CH$_2$CH$_2$CH$_2$O).

Polyether-2: n-Butanol-Started Acetylated PPG Monool with Average Molecular Weight about 1'150 g/mol 176.00 g of n-butanol-started polyoxypropylene monool (Synalox+ 100-40B, average molecular weight about 1'100 g/mol; from DowDuPont Inc.) and 18.74 g of acetic anhydride were converted as described for Polyether-1. A clear, colorless liquid having a viscosity of 140 mPa×s at 20éC was obtained.

Polyether-3: n-Butanol-Started Acetylated PPG Monool with Average Molecular Weight about 1'850 g/mol 288.00 g of n-butanol-started polyoxypropylene monool (Synalox+ 100-85B, average molecular weight about 1'800 g/mol; from DowDuPont Inc.) and 18.74 g of acetic anhydride were converted as described for Polyether-1. A clear, colorless liquid having a viscosity of 350 mPa×s at 20éC was obtained.

Polyether-4: Diacetylated PPG Diol with Average Molecular Weight about 800 g/mol 58.00 g of polyoxypropylene diol (polypropylene glycol, average molecular weight about 725 g/mol; from Sigma Aldrich Chemie GmbH) and 18.74 g of acetic anhydride were converted as described for Polyether-1. A clear, colorless liquid having a viscosity of 100 mPa×s at 20éC was obtained.

Polyether-5: Diacetylated PPG Diol with Average Molecular Weight about 1'100 g/mol 80.00 g of polyoxypropylene diol (Voranol+ P 1010, OH number 110 mg KOH/g; from DowDuPont Inc.) and 18.74 g of acetic anhydride were converted as described for Polyether-1. A clear, colorless liquid having a viscosity of 145 mPa×s at 20éC was obtained.

Polyether-6: Diacetylated PPG Diol with Average Molecular Weight about 2'100 g/mol 160.00 g of polyoxypropylene diol (Voranol 2000 L, OH number 56 mg KOH/g; from DowDuPont Inc.) and 18.74 g of acetic anhydride were converted as described for Polyether-1. A clear, colorless liquid having a viscosity of 400 mPa×s at 20éC was obtained.

Polyether-7: Diacetylated PPG Diol with Average Molecular Weight about 4'100 g/mol 600.0 g of polyoxypropylene diol (Acclaim⁺ 4200, OH number 28 mg KOH/g; from Covestro AG) and 33.7 g of acetic anhydride were converted as described for Polyether-1. A clear, colorless liquid having a viscosity of 1'150 mPa×s at 20éC was obtained.

Polyether-8: Diacetylated PPG Diol with Average Molecular Weight about 8'100 g/mol 600.0 g of polyoxypropylene diol (Acclaim⁺ 8200, OH number 14 mg KOH/g; from Covestro AG) and 16.8 g of acetic anhydride were converted as described for Polyether-1. A clear, colorless liquid having a viscosity of 3'800 mPa×s at 20éC was obtained.

Polyether-9: Triacetylated PPG Triol with Average Molecular Weight about 850 g/mol 74.40 g of polyoxypropylene triol (Desmophen⁺ 28HS98, OH number 230 mg KOH/g; from Covestro AG) and 37.48 g of acetic anhydride were converted as described for Polyether-1. A clear, colorless liquid having a viscosity of 135 mPa×s at 20éC was obtained.

Polyether-10: Triacetylated PPG Triol with Average Molecular Weight about 1650 g/mol 80.00 g of polyoxypropylene triol (Arcol⁺ LHT-112, OH number 112 mg KOH/g; from Covestro AG) and 18.74 g of acetic anhydride were converted as described for Polyether-1. A clear, colorless liquid having a viscosity of 285 mPa×s at 20éC was obtained.

Polyether-11: Triacetylated PPG Triol with Average Molecular Weight a Bout 3150 g/mol 160.00 g of polyoxypropylene triol (Desmophen⁺ 3061 BT, OH number 56 mg KOH/g; from Covestro AG) and 18.74 g of acetic anhydride were converted as described for Polyether-1. A clear, colorless liquid having a viscosity of 575 mPa×s at 20éC was obtained.

Preparation of Acid Solutions:
Solution L-1 to L-24

To an initial charge of 5 g of the solvent specified in table 1 in a pill bottle was added a sufficient amount of salicylic acid or 2-nitrobenzoic acid as to result in a concentration of 2.0% or 4.8% or 9.1% or 13.0% or 16.7% or 20.0% or 23.1% by weight of acid (100%=acid plus solvent), and the mixture was heated to 80éC in an air circulation oven. An attempt was then made in each case to fully dissolve the acid by means of stirring. If this was possible, the solution was then stored in an air circulation oven at 50éC for 7 days, then at 23éC for a further 7 days and finally in a refrigerator at 4éC for a further 7 days, and an assessment was made in each case at the end of the storage time at 50éC, 23éC and 4éC as to whether acid had crystallized out of the solution. The maximum stable concentration referred to that concentration of the solution at which no crystallization of the acid was observed at 4éC within 7 days.

The results are reported in table 1.

Examples labeled "(Ref.)" are comparative examples.

TABLE 1

Acid solutions having maximum stable concentration.

| Solvent | Solution | Salicylic acid | Solution | 2-Nitrobenzoic acid |
|---|---|---|---|---|
| Polyether-1 | L-1 | 16.7% | L-2 | 13.0% |
| Polyether-2 | L-3 | 20.0% | L-4 | 16.7% |
| Polyether-3 | L-5 | 20.0% | L-6 | 16.7% |

TABLE 1-continued

Acid solutions having maximum stable concentration.

| Solvent | Solution | Salicylic acid | Solution | 2-Nitrobenzoic acid |
|---|---|---|---|---|
| Polyether-4 | L-7 | 16.7% | L-8 | 16.7% |
| Polyether-5 | L-9 | 16.7% | L-10 | 13.0% |
| Polyether-6 | L-11 | 20.0% | L-12 | 16.7% |
| Polyether-9 | L-13 | 16.7% | L-14 | 16.7% |
| Polyether-10 | L-15 | 20.0% | L-16 | 16.7% |
| Polyether-11 | L-17 | 20.0% | L-18 | 16.7% |
| SPX-80 | L-19 | 16.7% | L-20 | 13.0% |
| DIDP (Ref.) | L-21 (Ref.) | 2.0% | L-22 (Ref.) | 2.0% |
| DOA (Ref.) | L-23 (Ref.) | 4.8% | L-24 (Ref.) | 2.0% |

Solution L-25 to L-38

A 10% acid solution was prepared in each case by dissolving 1.0 g of the acid specified in table 2 in 9.0 g of the solvent specified in table 2, and storing the solution in a closed container.

The viscosity of each solution at 20éC was measured as described above.

The results are reported in table 2.

TABLE 2

Viscosity of solutions L-25 to L-38 (10% solutions)

| Solution | Solvent | Acid | Viscosity |
|---|---|---|---|
| L-25 | Polyether-1 | p-toluenesulfonic acid | 115 mPaXs |
| L-26 | Polyether-1 | 2-nitrobenzoic acid | 120 mPaXs |
| L-27 | Polyether-1 | salicylic acid | 105 mPaXs |
| L-28 | Polyether-2 | salicylic acid | 235 mPaXs |
| L-29 | Polyether-3 | salicylic acid | 600 mPaXs |
| L-30 | Polyether-4 | salicylic acid | 160 mPaXs |
| L-31 | Polyether-5 | salicylic acid | 230 mPaXs |
| L-32 | Polyether-6 | salicylic acid | 640 mPaXs |
| L-33 | Polyether-7 | salicylic acid | 2'140 mPaXs |
| L-34 | Polyether-8 | salicylic acid | 5'550 mPaXs |
| L-35 | Polyether-9 | salicylic acid | 220 mPaXs |
| L-36 | Polyether-10 | salicylic acid | 455 mPaXs |
| L-37 | Polyether-11 | salicylic acid | 840 mPaXs |
| L-38 | SPX-80 | salicylic acid | 1'420 mPaXs |

Production of Curable (One-Component) Compositions:
Polymer P1:

400 g of polyoxypropylene diol (Acclaim⁺ 4200, from Covestro AG; OH number 28.5 mg KOH/g) and 52 g of diphenylmethane 4,4'-diisocyanate (Desmodur⁰ 44 MC L, from Covestro AG) were reacted by a known process at 80éC to give an NCO-terminated polymer which is liquid at room temperature and has an isocyanate group content of 1.85% by weight.

Polymer P2:

1'300 g of polyoxypropylene diol (Acclaim⁺ 4200, from Covestro AG; OH number 28 mg KOH/g), 2'600 g of ethylene oxide-terminated polyoxypropylene triol (Voranor⁺ CP 4755, from DowDuPont Inc.; OH number 35 mg KOH/g), 600 g of diphenylmethane 4,4'-diisocyanate (Desmodur⁺ 44 MC L, from Covestro AG) and 500 g of diisodecyl phthalate were reacted by a known process at 80éC to give an NCO-terminated polymer which is liquid at room temperature and has an isocyanate group content of 2.05% by weight.

Aldimine-1: N,N'-Bis(2,2-dimethyl-3-lauroyloxypropylidene)-3-aminomethyl-3,5,5-trimethylcyclohexylamine (=Latent Curing Agent)

598 g (2.1 mol) of 2,2-dimethyl-3-lauroyloxypropanal was initially charged in a round-bottom flask under a nitrogen atmosphere. Then 170.3 g (1 mol) of 3-aminomethyl- 3,5,5-trimethylcyclohexylamine (Vestamin+ IPD, from Evonik Industries AG) was added with good stirring, and then the volatile constituents were removed at 80éC and a reduced pressure of 10 mbar. 732 g of a colorless liquid having an amine content of 2.73 mmol N/g was obtained, corresponding to a calculated aldimine equivalent weight of 367 g/mol.

Compositions Z1 to Z9

For each composition, the ingredients specified in tables 3 to 4 were mixed in the amounts specified (in parts by weight) by means of a centrifugal mixer (S peedMixerù DAC 150, FlackTek Inc.) with exclusion of moisture at 3000 rpm for one minute and stored with exclusion of moisture.

Each composition was tested as follows:

Viscosity was measured at the temperature specified with a Rheotec RC30 thermostated cone-plate viscometer (cone diameter 25 mm, cone angle 1é, cone tip-plate distance 0.05 mm), with a shear rate of 5 s$^{-1}$ in the measurements at 0éC and of 10 s$^{-1}$ in the measurements at 10éC, 20éC and 30éC.

As a measure of the open time, skin time (ST) was determined. For this purpose, a few grams of the composition was applied to cardboard in a layer thickness of about 2 mm and, under standard climatic conditions, the first period of time after which no residues remained any longer on an LDPE pipette used to gently tap the surface of the composition was determined.

Shore A hardness was determined to DIN 53505 on test specimens cured under standard climatic conditions for 14 days.

To determine the mechanical properties, the composition was applied to a PTFE-coated film to give a film of thickness 2 mm, the film was stored under standard climatic conditions for 14 days, and a few dumbbells having a length of 75 mm with a bar length of 30 mm and a bar width of 4 mm were punched out of the film and these were tested in accordance with DIN E N 53504 at a strain rate of 200 mm/minute for Tensile strength (breaking force), Elongation at break, Modulus of elasticity 5% (at 0.5%-5% elongation) and Modulus of elasticity 25% (at 0.5%-25% elongation).

Appearance was assessed visually on the films produced. "Nice" was used to describe a nontacky film without blisters.

Odor was assessed by smelling by nose at a distance of 2 cm from the freshly produced films. "No" means that no odor was perceptible.

The results are reported in tables 3 to 4.

TABLE 3

Composition (in parts by weight) and properties of Z1 to Z3.

| Composition | | Z1 | Z2 | Z3 |
|---|---|---|---|---|
| Polymer P1 | | 39.50 | 39.50 | 39.50 |
| HDI trimer[1] | | 0.50 | 0.50 | 0.50 |
| Aldimine-1 | | 5.00 | 5.00 | 5.00 |
| Plasticizer | | DIDP | Polyether-1 | Polyether-5 |
| | | 20.70 | 20.70 | 20.70 |
| Carbon black[2] | | 20.00 | 20.00 | 20.00 |
| Chalk[3] | | 13.47 | 13.47 | 13.47 |
| Solution | | L-27 | L-27 | L-31 |
| | | 0.80 | 0.80 | 0.80 |
| DBTDL[4] | | 0.03 | 0.03 | 0.03 |
| Viscosity | 0 éC | 721 | 467 | 623 |
| [PaXs] | 10 éC | 286 | 169 | 229 |
| | 20 éC | 132 | 102 | 125 |
| | 30 éC | 90 | 69 | 82 |
| ST [min] | | 40 | 40 | 40 |
| Shore A | | 45 | 39 | 41 |
| Tensile strength [MPa] | | 1.68 | 1.02 | 1.33 |
| Elongation at break [%] | | 670 | 422 | 623 |
| Modulus of elasticity 5% [MPa] | | 2.52 | 2.14 | 2.50 |
| Modulus of elasticity 25% [MPa] | | 1.56 | 1.19 | 1.38 |
| Appearance | | nice | nice | nice |
| Odor | | no | no | no |

[1]Desmodur+ N 3300, NCO content 21.8% by weight (from Covestro AG)
[2]Monarch+ 570 (from Cabot Corp.)
[3]Omyacarb+ 5-GU (from Omya AG)
[4]dibutyltin dilaurate

TABLE 4

Composition (in parts by weight) and properties of Z4 to Z9.

| Composition | | Z4 | Z5 | Z6 | Z7 | Z8 | Z9 |
|---|---|---|---|---|---|---|---|
| Polymer P2 | | 40.0 | 40.0 | 40.0 | 40.0 | 40.0 | 40.0 |
| Aldimine-1 | | 5.5 | 5.5 | 5.5 | 5.5 | 5.5 | 5.5 |
| Plasticizer | | DIDP | DIDP | Polyether-1 | Polyether-5 | Polyether-6 | Polyether-7 |
| | | 20.7 | 20.7 | 20.7 | 20.7 | 20.7 | 20.7 |
| Carbon black[1] | | 20.0 | 20.0 | 20.0 | 20.0 | 20.0 | 20.0 |
| Chalk[2] | | 13.0 | 13.0 | 13.0 | 13.0 | 13.0 | 13.0 |
| Solution | | L-31 | L-32 | L-27 | L-31 | L-32 | L-33 |
| | | 0.8 | 0.8 | 0.8 | 0.8 | 0.8 | 0.8 |
| Viscosity | 0 éC | 1076 | 1089 | 734 | 1046 | 1297 | 1487 |
| [PaXs] | 10 éC | 306 | 331 | 202 | 292 | 517 | 647 |
| | 20 éC | 156 | 161 | 118 | 164 | 207 | 253 |
| | 30 éC | 95 | 99 | 80 | 107 | 132 | 151 |
| ST [min] | | 15 | 15 | 20 | 15 | 15 | 20 |
| Shore A | | 58 | 57 | 53 | 55 | 50 | 49 |
| Tensile strength [MPa] | | 8.9 | 7.8 | 8.2 | 9.0 | 7.9 | 7.2 |
| Elongation at break [%] | | 664 | 626 | 630 | 665 | 720 | 657 |
| Modulus of elasticity 5% [MPa] | | 3.30 | 3.42 | 2.76 | 3.04 | 2.29 | 2.59 |
| Modulus of elasticity 25% [MPa] | | 2.61 | 2.66 | 2.22 | 2.38 | 1.82 | 2.04 |
| Appearance | | nice | nice | nice | nice | nice | nice |
| Odor | | no | no | no | no | no | no |

[1]Monarch+ 570 (from Cabot Corp.)
[2]Omyacarb+ 5-GU (from Omya AG)

The invention claimed is:

1. A curable composition comprising (i) polymerizable macromolecules, and (ii) an acid solution that is obtained by contacting at least one aromatic carboxylic or sulfonic acid with at least one polyether having blocked hydroxyl groups as solvent so as to dissolve the at least one aromatic carboxylic or sulfonic acid to form an acid solution,
    wherein the blocked hydroxyl groups are selected from the group consisting of ester groups, aceto ester groups, carbonate groups, and urethane groups.

2. The curable composition as claimed in claim 1,
    wherein the polymerizable macromolecules include at least one polyisocyanate or polymer containing isocyanate groups, and
    wherein the curable composition further comprises at least one latent curing agent having at least one aldimino, ketimino, enamino, or oxazolidino group.

3. The curable composition as claimed in claim 2, wherein the at least one latent curing agent is an aldimine of the formula $A\text{---}[N\text{=}B]_y$, where y is 2 or 3, A is an organic radical having 2 to 23 carbon atoms, and B is an organic radical having 6 to 30 carbon atoms.

4. The curable composition as claimed in claim 2, wherein the composition is a one-component moisture-curing composition.

5. The curable composition as claimed in claim 1, wherein the composition is an adhesive or sealant or a coating.

6. An article bonded or sealed or coated with the curable composition as claimed in claim 1.

7. The curable composition as claimed in claim 1, wherein the blocked hydroxyl groups are acetate groups.

8. The curable composition as claimed in claim 1, wherein the at least one polyether having blocked hydroxyl groups is derived from at least one hydroxy-functional polyether selected from the group consisting of:
    alcohol-started polyoxypropylene monools having an OH number in a range from 25 to 90 mg KOH/g,
    polyoxypropylene diols having an OH number in a range from 12 to 155 mg KOH/g,
    trimethylolpropane- or glycerol-started polyoxypropylene triols having an average OH functionality in a range from 2.2 to 3 and an OH number in a range from 22 to 230 mg KOH/g, and
    sugar alcohol-started polyoxypropylene polyols having an average OH functionality in a range from 3 to 6.

* * * * *